Aug. 27, 1968  I. SZODFRIDT ET AL  3,398,603

TORQUE CONVERTER, CLUTCH, TRANSMISSION AND MOTOR CONTROLS

Filed Oct. 20, 1966  2 Sheets-Sheet 1

INVENTORS
Imre SZODFRIDT
Otto HAUSINGER

BY Dicke & Craig

ATTORNEYS

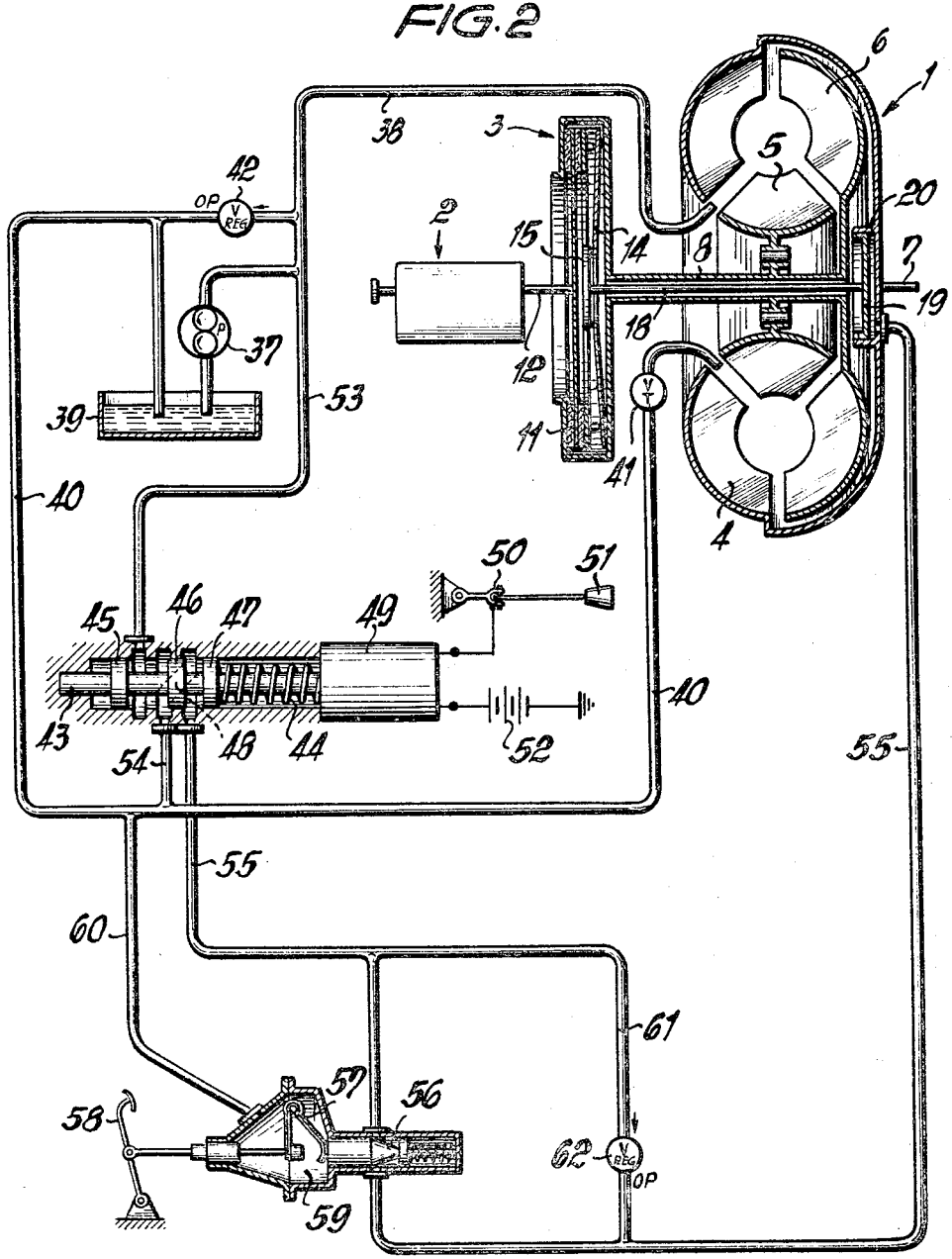

United States Patent Office 3,398,603
Patented Aug. 27, 1968

3,398,603
TORQUE CONVERTER, CLUTCH, TRANSMISSION AND MOTOR CONTROLS
Imre Szodfridt, Ditzingen, and Otto Hausinger, Gerlingen, Germany, assignors to Firma Dr. Ing. h.c.F. Porsche K.G., Stuttgart-Zuffenhausen, Germany
Filed Oct. 20, 1966, Ser. No. 588,142
Claims priority, application Germany, Nov. 4, 1965, P 38,041
14 Claims. (Cl. 74—645)

ABSTRACT OF THE DISCLOSURE

A compound transmission for automotive vehicles having a hydrodynamic torque converter, a multistage change speed gear transmission, and a clutch interposed between the converter and gear transmission that is actuated by the fluid pressure within the converter chamber under the control of the gear shift lever by a circuit having an electromagnetically controlled pilot valve for reducing the pressure on one side of the clutch actuator piston separate from the converter chamber.

Background of the invention

In the prior art, it is known to actuate the separating clutch of the compound transmission with the aid of auxiliary means, particularly switching signals produced by movement of the gear shift lever for operating an electromagnetically controlled pilot valve that controls a fluid circuit of the clutch actuating member to disengage the clutch. In order to employ a dry clutch, the prior art devices employ the subatmospheric pressure of the internal combustion engine for the clutch operating fluid. However, this does not insure a constant pressure for the actuation of the clutch; therefore, additional complicated and expensive means are required to maintain a smooth shifting operation. Another conventional arrangement employs a hydrodynamic-mechanical shaft connection wherein the cycle of the pressure medium for the torque converter is used simultaneously for shifting the separating clutch. In this embodiment, the clutch is provided in the converter space in the form of a wet clutch and is actuated by a ring piston having its spring biased side in communication with the atmosphere. In order to release such a clutch, it is required to employ a switching device having several pressure regulating valves, which valves increase the pressure in the converter chamber in front of the ring piston; this results in an undesirable pressure increase in the entire system.

Summary of the invention

It is an object of the present invention to provide for the satisfactory actuation of a separating clutch in the compound transmission while avoiding the above-noted disadvantages of the prior art.

A further object of the present invention is to provide a separating clutch in a compound transmission that is actuated by fluid obtained from and at the pressure of the fluid in the torque converter so that there is no increase in the pressure of the controlled system.

Another object of the present invention is to provide a compact construction of a torque converter and separating dry clutch.

Another object of the present invention is to employ a simplified clutch actuating system employing elements that perform multiple functions.

According to the present invention, the actuator of the separating clutch comprises an operating piston biased on both sides by the fluid pressure of the torque converter. One side of the piston can be connected with the back flow or return line of the torque converter by a pilot valve that is preferably also in communication with the pressure line of the torque converter to provide a by-pass. This construction results in a simple arrangement for releasing the separating clutch wherein the converter pressure and amount of converter fluid remains substantially constant before and during the actuation of the clutch. A further simplification resides in the fact that the pilot valve is provided between the pressure line and return line of the torque converter so that this pilot valve simultaneously performs the function of a pressure resistance or pressure maintaining valve for the torque converter. Preferably, a throttle slide valve is connected with a power control member that is manually actuated by the vehicle operator for controlling the power of the vehicle; this throttle slide valve is in the fluid pressure circuit between the pilot valve and the operating piston. Preferably, the return flow from the operating piston takes place through a relief valve to bypass the throttle slide valve. A smooth and shock-free operation of the separating clutch is obtained according to the above mentioned structure of the present invention by providing positive operation of the clutch that is controlled by the position of the power control member of the vehicle. At the same time, the structure assures that the return flow from the operating piston is unthrottled, which results in immediate disengagement of the clutch. When the throttle slide valve of the present invention is connected with the power control member of the vehicle, particular advantages result from the interposition of a heat sensitive transducer in the power train and a heat transfer contact with the pressure medium of the torque converter so that all factors in the operation of the compound transmission are controlled that would influence the operation of the clutch. The operating piston of the clutch actuating device is advantageously provided in the torque converter fluid chamber in a working cylinder that is open at one end for communication with the torque converter fluid chamber. Also, the piston has a piston rod passing through the torque converter chamber and provided with a declutching bearing and mechanism that is spring loaded for mechanical operation of the clutch. Thereby, a particularly advantageous and economical arrangement is made possible, without increasing the space requirements of the device. Furthermore, the clutch actuating device can be further simplified by providing a portion of the fluid pressure lines within the piston rod, particularly between the pilot valve and the piston side of the operating piston for connection with the return line of the torque converter.

Brief description of the drawing

Further objects, features and advantages of the present invention will appear from the following description of the accompanying drawings in which:

FIGURE 2 is a simplified schematic fluid diagram of the clutch actuation circuit.

Detailed description of the drawing

Figure 1:
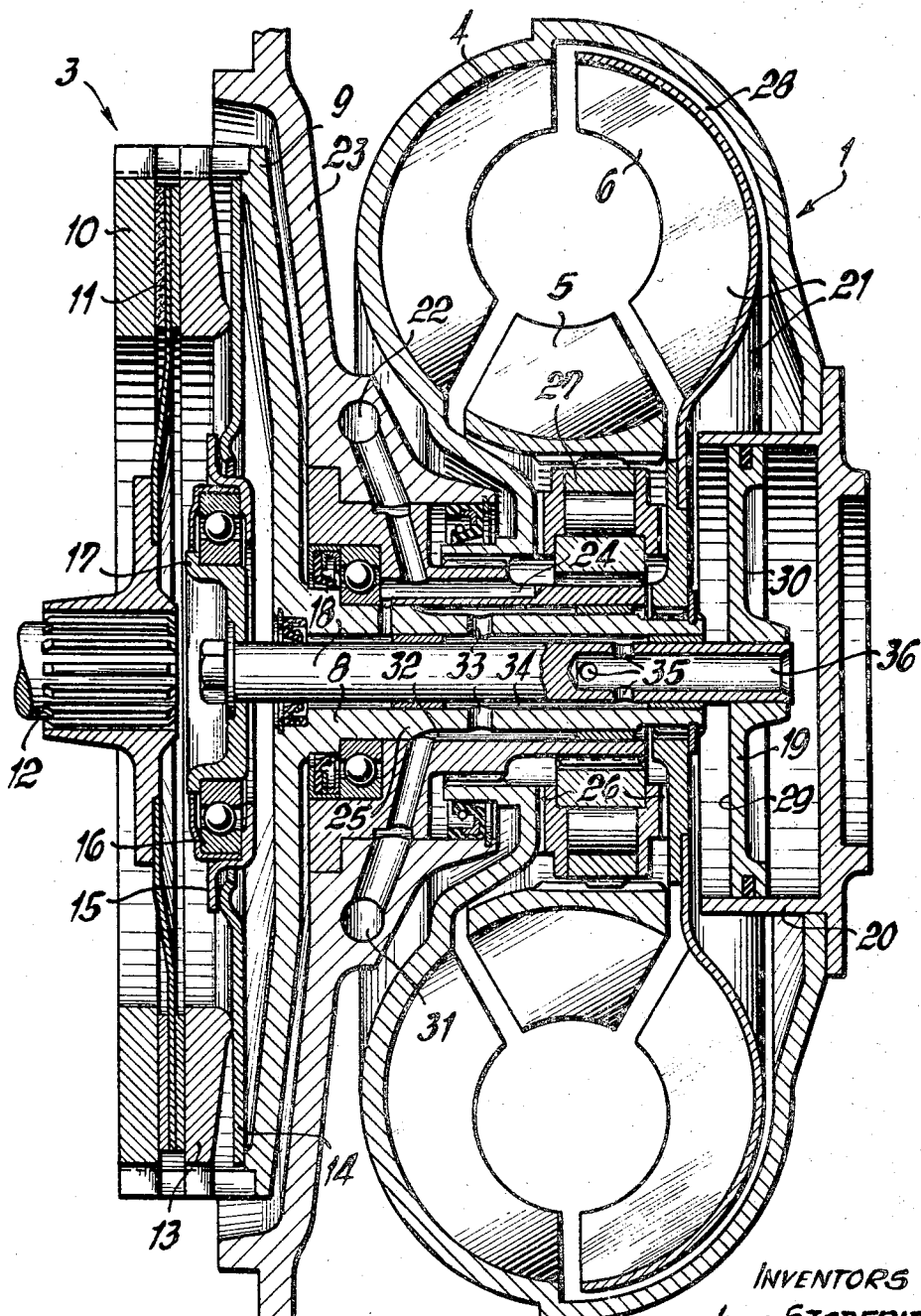
FIGURE 1 is a longitudinal, cross-sectional view, with portions broken away, of a compound transmission according to the present invention.

The compound transmission of the present invention basically comprises a hydrodynamic torque converter 1, a multi-stage change speed gear transmission 2 and a separating clutch 3, as schematically shown in FIG. 2. The separating clutch 3 establishes and interrupts the drive between the gear transmission 2 and the torque converter 1 when shifting into the individual gears (not shown). The torque converter 1 has a pump impeller 4, a guide impeller 5 and a turbine wheel 6. The pump impeller 4 constitutes the input and is in driving connection, in a conventional manner, with the crank shaft 7 of an internal combustion engine, which is not shown in detail because it is conventional. The turbine wheel 6 is in driving engagement with a hollow shaft 8 that terminates in a drive flange 9, which carries the counter pressure abutment 10 for the friction disc 11 of the separating clutch 3. The friction disc 11 is mounted for rotation with the clutch output member or primary shaft 12 of the gear transmission. A pressure plate 13 is mounted for rotation with an axial sliding movement with respect to the drive flange 9 for pressing the friction disc 11 against the abutment 10 under the force of a cup shaped spring 14. The cup shaped spring 14 engages at its inward portion a declutching support bearing 15 having a roller bearing 16. The flange 17 of the support bearing 15 is connected with the piston rod 18 of an operating piston 19 that is operatively mounted within a working cylinder 20. It is thus seen that the clutch is spring urged into engagement and disengagement by axial reciprocation of the piston rod 18 under the influence of the piston 19.

The working cylinder 20 is rigidly connected for rotation with the pump impeller 4 and extends into the converter chamber 21 that contains the pressure fluid. As seen in FIGURE 1, the left hand end of the working cylinder 20 is in open fluid communication with the chamber 21.

Fluid under pressure is conducted to the torque converter chamber 21 through a bore 22 in the intermediate wall or housing 23 that separates the clutch 3 from the torque converter 1. From the bore 22, the fluid travels through a channel 24 in the support 25 in the guide impeller 5, through an annular slot 26 between the bypass opening 27 of the guide impeller 5, to the fluid chamber 21 containing the rotating parts 4, 5 and 6 of the torque converter 1. Furthermore, the slot 28 between the pump impeller 4 and the turbine wheel 6 establishes fluid communication between the core of the torque converter and the side 29 of the operating piston 19, so that the side 29 of the piston is constantly exposed to the pressure of the fluid within the torque converter chamber 21. The opposite side 30 of the piston 19 is supplied with fluid through a bore 31 in the intermediate wall 23. From the bore 31, the fluid passes into an annular slot 32 that is between the support 25 and the hollow shaft 8, and from there the fluid flows through transverse bores 33 into a further annular slot 34 between the piston rod 18 and the hollow shaft 8. From the annular slot 34, the fluid passes through the recesses 35 into a longitudinal bore 36 that is within the piston rod 18. From the longitudinal bore 36, the fluid flows into the space or chamber defined by the piston side 30 and the working cylinder 20.

As more clearly shown in FIGURE 2, the fluid under pressure is supplied by a feed pump 37 that is driven by the internal combustion engine. The feed pump 37 is connected on the pressure side with a supply line 38 to the bore 22 that was mentioned in regard to FIGURE 1 for supplying pressure fluid into the torque converter chamber 21. The backflow of the fluid into the storage vessel 39 of the pump 37 takes place through a return line 40 from the torque converter under the influence of a throttle valve 41. A pressure release or check valve 42 is interposed in a bypass circuit between the supply line 38 and the return line 40 to prevent flow of fluid from the line 40 to the supply line 38 and to provide a bypass circuit for conducting high pressure fluid from the supply line 38 to the return line 40 only upon fluid pressure overload that is determined by the fixed force of the spring in the valve 42.

A pilot valve 43 is provided in fluid communication between the supply line 38 and the return line 40. The pilot valve is a spool type valve that is biased in one direction by a spring 44 to act as the pressure maintaining valve for the torque converter, that is, to control the pressure within the torque converter. The pilot valve 43 has three control collars 45, 46 and 47 that are axially spaced from each other. The annular chambers between the collars 45 and 46, and the collars 46 and 47 are in fluid communication with each other by means of a transverse bore 48. The pilot valve 43 is drivingly connected with the armature of an electromagnetic 49 (the armature not shown for simplicity). A switch 50 controls the exciting circuit for the electromagnet 49; this switch is in turn controlled by operation of the gear transmission gear shift lever 51. The excitation circuit of the electromagnet 49 also includes the vehicle battery 52. A branch line 53 from the supply line 38 is in fluid communication with an annular control groove in the housing for the pilot valve 43, between the control collars 45, 46. The branch line 53 supplies fluid during the operating period of the torque converter through the pilot valve to a line 54 that is connected to the return line 40. Furthermore, the branch line 53 is in fluid communication with a line 55 through the transverse bore 48 of the pilot valve 43; the line 55 supplies the fluid to the bore 31 that was mentioned in regard to FIGURE 1 for supplying fluid into the working cylinder 20 on the side 30 of the operating piston 19. The line 55 includes a throttle slide valve 56 that is biased in one direction by a spring and is connected through the intermediary of a bimetallic spring 57 or heat responsive transducer to the power control member 58 that is manually actuated by the vehicle operator for controlling the power of the vehicle. The throttle slide valve 56 and the bimetallic spring 57 are mounted in a housing 59 that contains the operating fluid for heat exchange contact between the bimetallic spring 57 and the fluid. The fluid is supplied to the housing 59 through a secondary line 60 that is in fluid communication with the return line 40. A bypass line 61 is provided to bypass fluid around the throttle valve 56 in passage through the line 55. The bypass line 61 is provided with a one-way check valve 62 for controlling the return flow of the fluid from the side 30 of the piston 19 so that it will bypass the throttle valve 56 and not be subject to any throttling.

In the position shown in the drawings, the separating clutch 3 is engaged and the fluid control circuit is adjusted for controlling the pressure in the torque converter for operation of the torque converter. The primary shaft 12 of the gear transmission 2 is driven from the crank shaft 7, pump impeller 4, turbine wheel 6, hollow shaft 8, and the separating clutch 3. In this operating position, the fluid pressure is ambient, according to the schematic diagram of FIGURE 2, in front of and behind the operating piston 19 of the clutch actuating device, which corresponds to the normal pressure of the converter chamber 21.

When changing gears in the gear transmission 2, the gear shift lever 51 is actuated in a conventional manner. Movement of the gear shift lever 51 actuates the switch 50 to supply current to the activating circuit of the electromagnet 49 so that its armature (not shown) is attracted and the pilot valve 43 slides to the right, as seen in FIGURE 2 of the drawing until the control collar 45 closes the line 53 and the control collar 46 permits a direct passage of fluid from the line 55 into the return flow line 54, 40. With fluid under pressure being fed into the converter chamber 21 and thus on the side 29 of the operating piston 19, the backflow of the fluid on the opposite side 30 is instantaneously effected. Therefore, the piston 19 quickly moves to the right, as shown in the drawings, and carries with it the piston rod 18 and the declutching support bearing 15 against the bias of the cup spring 14 to disengage the clutch by placing the friction disc 11 out of engagement. The fluid under pressure is conducted from the working cylinder 20 in front of the piston side 30 through the bores 36, 35 and 33 in combination with the annular slot 34, 32, and thereafter through the line 55 for return to the storage vessel 39. In this return flow, the fluid bypasses the throttle slide valve 56 through the check valve 62 and the bypass line 61. The return flow of the fluid through the line 55 employs the pilot valve 43, the return line 54 and the return line 40. Once the gear shifting has been completed by the gear shift lever 51, the switch 50 is opened to deactivate electromagnet 49 for returning the pilot valve 43 by the force of its spring 44 into the starting position shown in the drawing so that the feed of the fluid to the operating piston 19 is re-established through the line 55 and 53. The throttle slide valve 56 regulates the clutch engagement in dependence upon the position of the power control member 58 by controlling the cross sectional area of the through passage in the line 55; the check valve 62 prevents passage of fluid through the line 61 during the supply of fluid to the piston 19 through the line 55. Also, the bimetallic spring 57 further controls the throttling of the fluid supply for re-establishing engagement of the clutch in dependence upon the temperature of the fluid. The clutch engagement is accomplished by the piston 19 sliding to the left when the pressure on the opposite sides of it is substantially equalized and under the influence of the spring 14 so that the friction disc 11 is again pressed against the abutment 10 by the cup spring 14 through the action of the pressure plate 13. The position of the throttle slide valve 56 is determined by the combined effect of the power control member, the pressure medium, and the bimetallic spring 57.

The above embodiments have been shown and described as examples only and other modifications of the embodiments are contemplated within the spirit and scope of the present invention as defined by the following claims.

We claim:

1. A compound transmission, especially for an automotive vehicle having an engine comprising: a hydrodynamic torque converter having an input and an output; a multistage change speed gear transmission having a gear shift lever, an input and an output; clutch means for selectively drivingly connecting and disconnecting said converter and said gear transmission; fluid operated piston means for actuating said clutch and having a piston with two opposite working sides; conduit means for supplying the fluid of said converter to at least one side of said piston sides at all times; clutch actuator means for controlling the pressure of the fluid on only the other of said sides of said piston; and resilient means normally biasing said piston means in the direction of clutch engagement.

2. The device of claim 1, a fluid pump; supply line means for supplying fluid under pressure to said converter from said pump; return line means for returning the fluid from said converter to said pump; said clutch actuator means including pilot valve means controlled by the position of said gear shift lever; said conduit means connecting said other side of said piston to said return line means through said pilot valve means.

3. The device of claim 2, said conduit means directly connecting said supply line means with said return line means and bypassing said converter during clutch engagement to substantially equalize the pressure on each side of said piston and in said converter; said pilot valve means maintaining the pressure in said converter.

4. The device of claim 3, a throttle slide valve connected in fluid series with said other side of said piston and said clutch actuator means for throttling the fluid; power control means for manual actuation by the vehicle operator for controlling the power of the vehicle and operatively connected for simultaneous control of said throttle slide valve means; second conduit means, including a one way valve, for bypassing said throttle valve means only during the return flow of fluid from said other side of said piston.

5. The device of claim 4, heat operated transducer means in heat exchange contact with the fluid and mechanically between said power control means and said throttle slide valve means for varying the response of said throttle control valve means produced by said power control means in dependence upon the temperature of the fluid.

6. The device of claim 5, said converter having a fluid chamber, said fluid operated piston means being within the fluid chamber of said converter and including a working cylinder open at one side to the converter fluid in the chamber and operatively receiving said piston; said biasing means being spring means biasing said clutch means into its engaged position; piston rod means drivingly connected to said piston at one end and having a spring engaging bearing at its other end for retracting said spring means to disengage said clutch means.

7. The device of claim 6, a portion of said piston rod being hollow and constituting a portion of said conduit means.

8. The device of claim 1, a throttle slide valve connected in fluid series with said other side of said piston and said clutch actuator means for throttling the fluid; power control means for manual actuation by the vehicle operator for controlling the power of the vehicle and operatively connected for simultaneous control of said throttle slide valve means; second conduit means, including a one way valve, for bypassing said throttle valve means only during the return flow of fluid from said other side of said piston.

9. The device of claim 8, heat operated transducer means in heat exchange contact with the fluid and mechanically between said power control means and said throttle slide valve means for varying the response of said throttle control valve means produced by said power control means in dependence upon the temperature of the fluid.

10. The device of claim 2, a throttle slide valve connected in fluid series with said other side of said piston and said clutch actuator means for throttling the fluid; power control means for manual actuation by the vehicle operator for controlling the power of the vehicle and operatively connected for simultaneous control of said throttle slide valve means; second conduit means, including a one-way valve, for bypassing said throttle valve means only during the return flow of fluid from said other side of said piston.

11. The device of claim 10, heat operated transducer means in heat exchange contact with the fluid and mechanically between said power control means and said throttle slide valve means for varying the response of said throttle control valve means produced by said power control means in dependence upon the temperature of the fluid.

12. The device of claim 1, said converter having a fluid chamber, said fluid operated piston means being within the fluid chamber of said converter and including a working cylinder open at one side to the converter fluid in the chamber and operatively receiving said piston; said biasing means being spring means biasing said clutch means into its engaged position; piston rod means drivingly connected to said piston at one end and having a spring engaging bearing at its other end for retracting said spring means to disengage said clutch means.

13. The device of claim 2, said converter having a fluid chamber, said fluid operated piston means being within the fluid chamber of said converter and including a working cylinder open at one side to the converter fluid in the chamber and operatively receiving said piston; said biasing means being spring means biasing said clutch means into its engaged position; piston rod means drivingly connected to said piston at one end and having a spring engaging bearing at its other end for retracting said spring means to disengage said clutch means.

14. The device of claim 13, a portion of said piston rod being hollow and constituting a portion of said conduit means.

References Cited
UNITED STATES PATENTS

| | | | |
|---|---|---|---|
| 3,132,530 | 5/1964 | Brise | 192—3.33 X |
| 3,213,988 | 10/1965 | Maurice et al. | 192—3.33 X |
| 3,235,043 | 2/1966 | Maurice et al. | 192—3.33 X |
| 2,992,713 | 7/1961 | Stump | 192—3.33 X |
| 3,280,657 | 10/1966 | Holdeman | 192—3.5 X |

BENJAMIN W. WYCHE III, *Primary Examiner.*